United States Patent
Samejima et al.

(10) Patent No.: US 6,848,246 B2
(45) Date of Patent: Feb. 1, 2005

(54) MOWER UNIT ATTACHABLE TO A VEHICLE BODY

(75) Inventors: Kazuo Samejima, Sakai (JP); Yoshikazu Togoshi, Sakai (JP); Teruo Shimamura, Sakai (JP); Masatoshi Yamaguchi, Sakai (JP); Yoshiyuki Esaki, Sakai (JP); Kenichi Chujo, Sakai (JP); Yoshihiro Kawahara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/378,555

(22) Filed: Mar. 3, 2003

(65) Prior Publication Data

US 2004/0006960 A1 Jan. 15, 2004

(30) Foreign Application Priority Data

Jul. 10, 2002 (JP) ...................................... 2002-201753

(51) Int. Cl.$^7$ .............................................. A01D 67/00
(52) U.S. Cl. ............................................ 56/320.2; 56/6
(58) Field of Search ........................ 56/6, 320.1, 320.2, 56/17.5

(56) References Cited

U.S. PATENT DOCUMENTS

| | | | |
|---|---|---|---|
| 4,226,074 A | * 10/1980 | Mullet et al. | ............... 56/320.2 |
| 5,133,176 A | 7/1992 | Baumann et al. | |
| 5,457,947 A | * 10/1995 | Samejima et al. | ........... 56/16.7 |
| 5,465,564 A | * 11/1995 | Koehn et al. | ............... 56/320.2 |
| 5,628,171 A | 5/1997 | Stewart et al. | |
| 5,845,475 A | 12/1998 | Busboom et al. | |
| 5,987,863 A | 11/1999 | Busboom et al. | |

FOREIGN PATENT DOCUMENTS

| | | |
|---|---|---|
| JP | (1994) 6-14634 | 2/1994 |
| JP | (1996) 8-280225 | 10/1996 |

* cited by examiner

*Primary Examiner*—Meredith Petravick
(74) *Attorney, Agent, or Firm*—Webb Ziesenheim Logsdon Orkin & Hanson, P.C.

(57) ABSTRACT

A mower unit attachable to a vehicle body includes a mower deck. The mower deck defines a grass discharge opening at an opposite side of one side wall, and has a plurality of rotary blades juxtaposed inside the mower deck to be rotatable about vertical axes. All of the rotary blades are rotatable in the same direction so that a front half, with respect to a traveling direction, of a track of rotation of each rotary blade points toward the side having the grass discharge opening. A rear baffle depends from a top board of the mower deck for enclosing the rotary blades in combination with a front wall, and surrounds, in form of a concentric part circle, a rear portion of the track of rotation of each rotary blade. A front baffle and a mulching baffle are provided to be selectively attached to the mower deck to be located forwardly of the tracks of rotation of the rotary blades. The front baffle includes curved segments each for surrounding, in form of a concentric part circle, a front portion of the track of rotation of one rotary blade, and counter curved segments for connecting the curved segments. The mulching baffle, in combination with the rear baffle, defines a mulching chamber surrounding the track of rotation of each rotary blade.

13 Claims, 14 Drawing Sheets

MOWER UNIT ATTACHABLE TO A VEHICLE BODY

BACKGROUND OF THE INVENTION

1. Field of the Invention

This invention relates to a mower unit attachable to a vehicle body and including a mower deck having a top board and one front wall and one side wall depending from the top board. The mower deck defines a grass discharge opening opposed to the side wall, and contains a plurality of rotary blades arranged side by side to be rotatable about vertical axes. All these rotary blades are rotatable in the same direction so that the front half, with respect to a traveling direction of the vehicle, of a rotating track of each blade points toward the side defining the grass discharge opening.

2. Description of the Related Art

In a mower unit of the type noted above, as disclosed in Japanese Patent Publication (Unexamined) No. 8-280225, for example, the top board of the mower deck has a front portion arched to define a tunnel therein extending to the grass discharge opening at one side of the deck. Grass clippings flying from the front half of the rotating track of each rotary blade are transported along the tunnel to the grass discharge opening. Such a mower unit is known as the side discharge type and is in wide use.

A mulching operation is sometimes required to cut grass clippings into minute pieces (mulch) and leave them along swaths in order to make a collection of grass clippings unnecessary and to utilize the grass clippings as compost. For this purpose, as disclosed in Japanese Patent Publication (Unexamined) No. 6-14634, a proposal has been made to provide mulching baffles inside the mower deck to define a mulching chamber (enclosure) for each rotary blade.

The above-noted mower deck having a tunnel for transporting grass clippings is capable of transporting the grass clippings smoothly and promptly along the tunnel, with little chance of the grass clippings entrained by the rotary blades. This mower deck has an advantage of cutting tall grass or lawn in a neglected condition, with little power loss due to the clippings being entrained by the rotary blades. However, this mower deck is ill-suited for an operation to cut only upper part of grass under good care, and discharge and scatter the clippings evenly in an inconspicuous way.

When a mulching operation is carried out by using the mower deck with a tunnel, mulching chambers are formed by installing baffles rearwardly of the tunnel, i.e. in regions of small depth. It is difficult to retain grass clippings in the mulching chambers for a sufficiently long time. It is thus difficult to secure a long mulching time for improved mulching efficiency.

Further, U.S. Pat. Nos. 5,845,475 and 5,987,863 disclose mower units of the side discharge type convertible to the mulching type by mounting mulching baffles in the mower deck. However, such a mulching mower unit with mulching baffles mounted in the mower deck has a flow control baffle for use in the side discharge remaining fixed, which is inconvenient for a mulching operation.

SUMMARY OF THE INVENTION

This invention has been made having regard to the state of the art noted above, and its object is to provide a mower unit convertible to the side discharge type or mulching type reliably and efficiently.

Another object of this invention is to provide a mower unit of the mulching type having an improved flow of grass clippings.

The first-mentioned object is fulfilled, according to this invention, by a mower unit attachable to a vehicle body comprising:

a mower deck having a top board and one front wall and one side wall depending from the top board, the mower deck defining a grass discharge opening at an opposite side of the side wall;

a plurality of rotary blades juxtaposed inside the mower deck to be rotatable about vertical axes, all of the rotary blades being rotatable in the same direction so that a front half, with respect to a traveling direction, of a track of rotation of each rotary blade points toward the side having the grass discharge opening;

a rear baffle depending from the top board for enclosing the rotary blades in combination with the front wall, and surrounding, in form of a concentric part circle, a rear portion of the track of rotation of each rotary blade; and a front baffle and a mulching baffle selectively attachable to the mower deck to be located forwardly of the tracks of rotation of the rotary blades;

the front baffle including curved segments each for surrounding, in form of a concentric part circle, a front portion of the track of rotation of one rotary blade, and counter curved segments for connecting the curved segments, thereby to guide grass clippings cut by the rotary blades located upstream with respect to a grass discharging direction, into areas of rotation of the rotary blades located downstream with respect to the grass discharging direction;

the mulching baffle, in combination with the rear baffle, defining a mulching chamber surrounding the track of rotation of each rotary blade.

With this construction, selection may be made as appropriate between a shredding side discharge mode using the front baffle attached to the deck, and a mulching mode with the mulching baffle attached in place of the front baffle. The shredding side discharge mode with the front baffle attached may be selected when, for example, upper part of grass under good care or light grass is cut, shredded and discharged. The mulching mode with the mulching baffle attached may be selected when shredding grass clippings into especially fine pieces and leaving them along swaths.

In the shredding side discharge mode, the mulching baffle is removed completely. In the mulching mode, the front baffle is removed completely. Each mode is free from the inconvenience of the unnecessary member remaining attached.

The front wall may be shaped, in combination with the top board, the side wall and the rear baffle, for transmitting grass clippings cut by the rotary blades to the grass discharge opening when both the front baffle and the mulching baffle are removed. Then, a standard side discharge mode is produced by removing the front baffle and mulching baffle. This side discharge mode may be used with advantage when simply cutting tall grass or lawn in a neglected condition.

In a preferred embodiment of the invention, the counter curved segments of the front baffle have a radius substantially corresponding to a radius of rotation of the rotary blades. In the shredding side discharge mode with the front baffle attached, according to this construction, grass clippings reaped by the rotary blades located upstream in the grass discharging direction are fed into the area of rotation of the rotary blades located downstream in the grass discharge direction. As the grass clippings arrive at the counter curved segments, the smoothly extending guide surfaces of the counter curved segments, while scattering the clippings over large ranges and feed the clippings into the areas of rotation of the downstream rotary blades for shredding action.

In another preferred embodiment of the invention, three rotary blades are juxtaposed inside the mower deck, and when the mulching baffle is attached, portions of the mulching baffles and portions of the rear baffle define circular mulching chambers of left and right rotary blades concentric with tracks of rotation of the left and right rotary blades, and a remaining portion of the mulching baffle and a remaining portion of the rear baffle define a mulching chamber of the middle rotary blade having a shape partly encroached on by the mulching chambers of the left and right rotary blades. With this construction, cutting winds produced in the circular mulching chambers of the left and right rotary blades tend to enter the middle mulching chamber slightly deviating from a circle, and circulate therein smoothly. The grass clippings are shredded and scattered more effectively in the circular mulching chambers than in the middle mulching chamber. Thus, the left and right rotary blades leave an excellent finish of cutting performance.

This type of mower unit is often attached between front and rear wheels of a vehicle body. With a three rotary-blade type mower unit, the left and right rotary blades have working ranges overlapping the tracks of the front and rear wheels. Grass trampled down by the front wheels may not be cut reliably, or shredded grass clippings may concentrate on the tracks of the front wheels. Lumps of grass clippings may be formed as a result of the rear wheels treading on the swaths. Such inconveniences are obviated or mitigated by improving the reaping and shredding performance and clippings scattering performance in the circular, left and right mulching chambers.

Each of the front baffle and mulching baffle may be made dividable into at least two segments. This provides convenience for storing the front baffle or mulching baffle when out of use.

The second object noted hereinbefore is fulfilled by a mower unit attachable to a vehicle body comprising:

- a mower deck having a top board and one front wall and one side wall depending from the top board, the mower deck defining a grass discharge opening at an opposite side of the side wall;
- a plurality of rotary blades juxtaposed inside the mower deck to be rotatable about vertical axes, all of the rotary blades being rotatable in the same direction so that a front half, with respect to a traveling direction, of a track of rotation of each rotary blade points toward the side having the grass discharge opening;
- a rear baffle depending from the top board for enclosing the rotary blades in combination with the front wall, and surrounding, in form of a concentric part circle, a rear portion of the track of rotation of each rotary blade; and
- a front baffle attached to the mower deck to be located forwardly of the tracks of rotation of the rotary blades;
- the front baffle including curved segments each for surrounding, in form of a concentric part circle, a front portion of the track of rotation of one rotary blade, and counter curved segments for connecting the curved segments, thereby to guide grass clippings cut by the rotary blades located upstream with respect to a grass discharging direction, into areas of rotation of the rotary blades located downstream with respect to the grass discharging direction.

Other features and advantages of this invention will be apparent from the following description of the embodiment to be taken with reference to the drawings.

DESCRIPTION OF THE PREFERRED EMBODIMENTS

Figure 1:
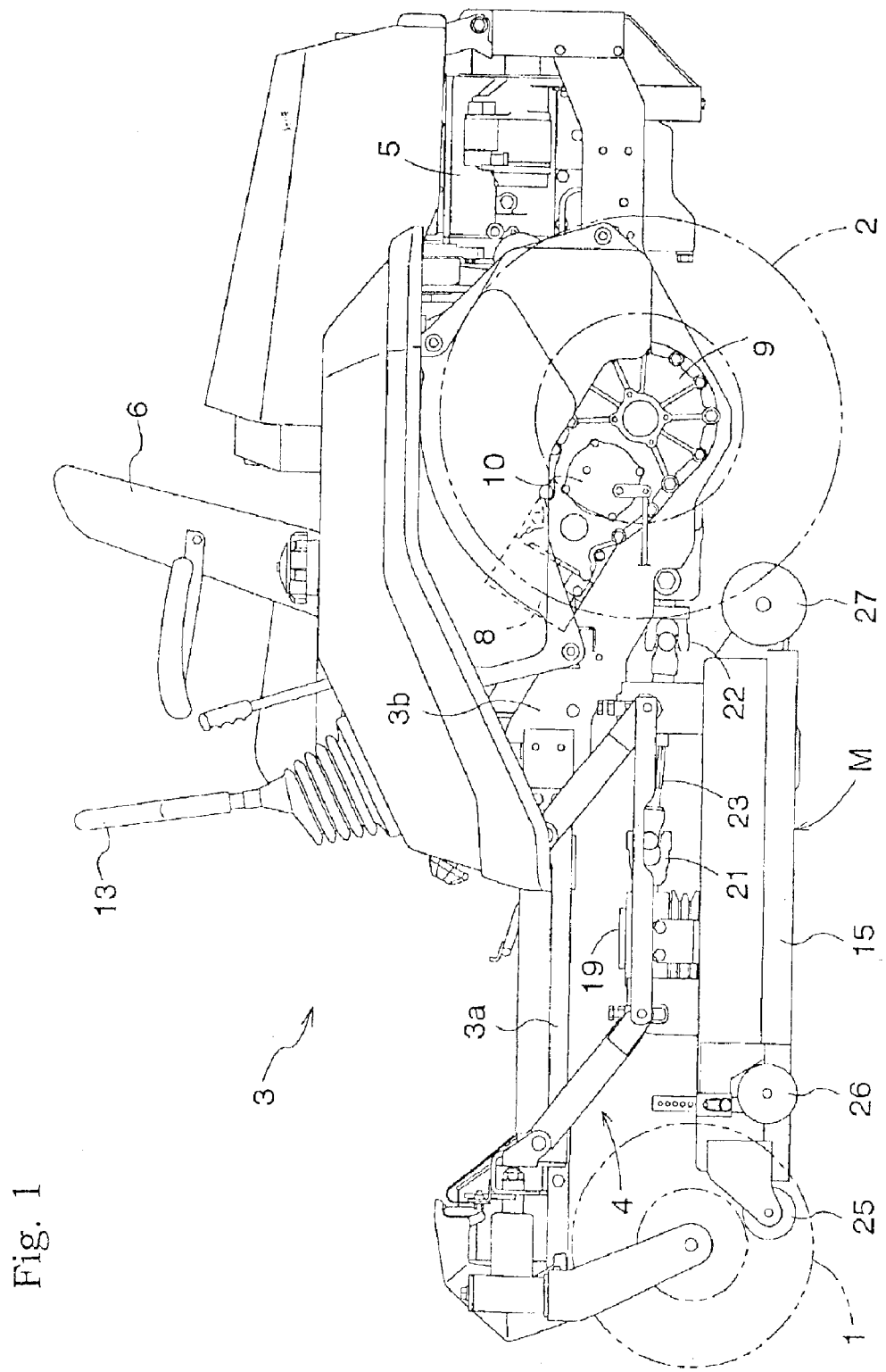
FIG. 1 is a side elevation of a riding lawn mower with a mower unit according to this invention.
Figure 2:
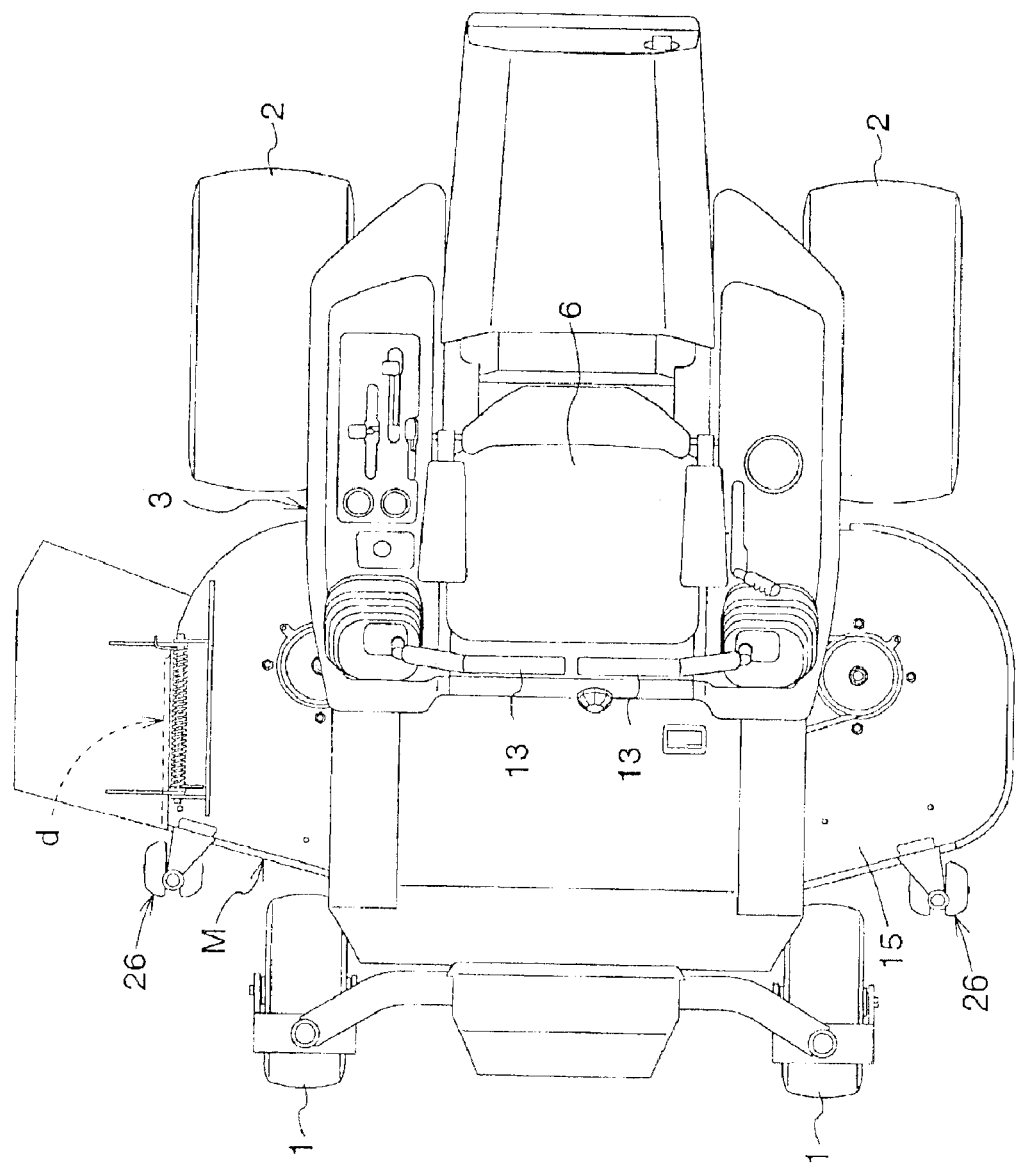
FIG. 2 is a plan view of the riding lawn mower shown in FIG. 1.
Figure 3:
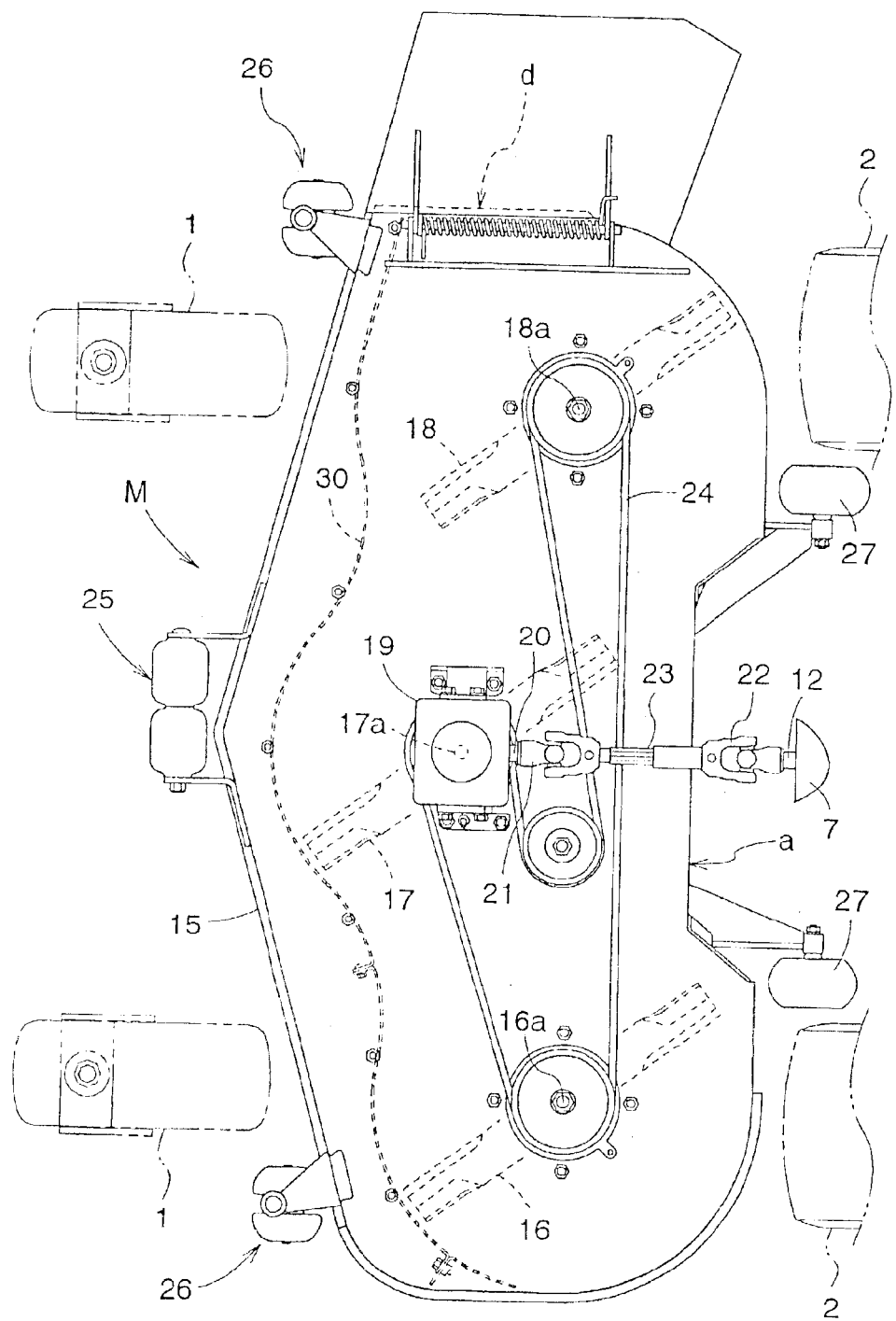
FIG. 3 is a plan view of the mower unit.

FIG. 1 shows a side elevation of a riding lawn mower with a mower unit M according to this invention. FIG. 2 shows a plan view of the riding lawn mower. This lawn mower includes a pair of right and left front wheels 1 in the form of casters, a pair of right and left drive rear wheels 2, and a vehicle body 3 supported by these wheels. The mower unit M is suspended from the vehicle body 3 between the front and rear wheels by a four-point link mechanism 4. The mower unit M may be moved up and down substantially parallel by vertically moving the link mechanism 4 with hydraulic pressure or manually. An engine 5 is mounted in a rearward position of the vehicle body 3, and a driver's seat 6 disposed forwardly of the engine 5.

Figure 4:
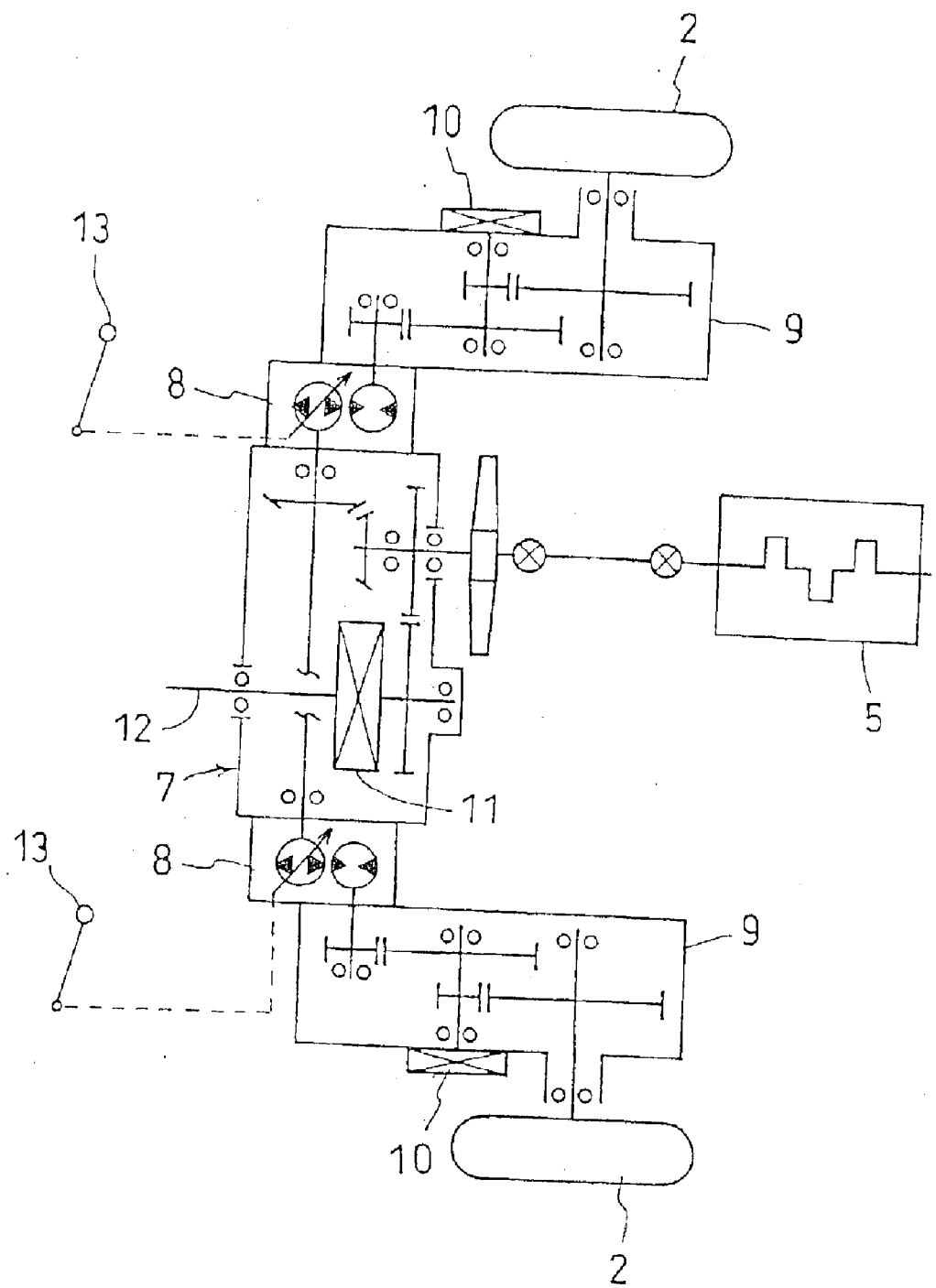
FIG. 4 is a schematic view of a transmission structure.

A rear transmission structure is supported by a pair of right and left rear frames 3b extending rearward and downward from main frames 3a of the vehicle body 3. The transmission structure is schematically shown in FIG. 4. Output of the engine 5 is inputted to a counter case 7 to be divided to a propelling line and a working line. The power for the propelling line is converted into sideways rotary power, and inputted to a pair of right and left hydrostatic stepless transmissions (HSTs) 8. Power output in variable speed of each transmission 8 is transmitted to one of the rear wheels 2 through a reduction case 9. Each reduction case 9 includes a brake 10 for acting on the right or left rear wheel 2. The power for the working line is transmitted through a PTO clutch 11 and outputted forward from a PTO shaft 12.

The right and left stepless transmissions 8 are shiftable by propelling levers 13 arranged at opposite sides of the driver's seat 6 to be rockable fore and aft, respectively. Thus, the right and left rear wheels 2 are driven forward and backward in varied speeds independently of each other. When the right and left propelling levers 13 are rocked by the same amount forward, the right and left rear wheels 2 are driven at the same speed forward to move the vehicle body 3 straight forward. When the right and left propelling levers 13 are rocked by the same amount backward, the vehicle body 3 moves straight backward. When the right and left propelling levers 13 are rocked by different amounts, the right and left rear wheels 2 are driven at different speeds to turn the vehicle body 3 in a selected direction. Particularly when one of the propelling levers 13 is placed in a neutral stop position and the other propelling lever 13 is rocked to a forward or backward drive range, the vehicle body 3 makes a pivot turn about the rear wheel 2 standing still. When the propelling levers 13 are rocked in opposite directions from the neutral position, the right and left rear wheels 2 are driven in opposite directions to cause the vehicle body 3 to make a spin turn about a midpoint between the right and left rear wheels 2.

The mower unit M has a mower deck 15 opening downward and containing three rotary blades 16, 17 and 18 rotatable about vertical axes. The rotary blades 16, 17 and 18 are in a triangular arrangement in plan view, with the middle rotary blade 17 offset slightly forward. The mower deck 15 is a flat deck having a larger vertical depth than the mower deck with a tunnel, and a top board even in height over the ground as a whole. The mower deck 15 has a grass discharge opening d formed at the right-hand end thereof.

The working power taken from the PTO shaft 12 is transmitted to an input shaft 20 extending rearward from a bevel gear case 19 disposed centrally of an upper surface of the mower deck 15, through a pair of universal joints 21 and 22 and a telescopic transmission shaft 23. The bevel gear case 19 converts the power into rotation of a vertical shaft, and transmits the rotation to a rotary shaft 17a of the middle rotary blade 12. This rotary shaft 17a and rotary shafts 16a and 18a of the left and right rotary blades 16 and 18 are interlocked by a belt 24 wound thereon. All of the rotary blades 16, 17 and 18 are rotated in the same direction (clockwise as seen from above) and at the same speed, so that the front halves of the tracks of rotation of the rotary blades 16, 17 and 18 point toward the grass discharge opening d.

Figure 5:
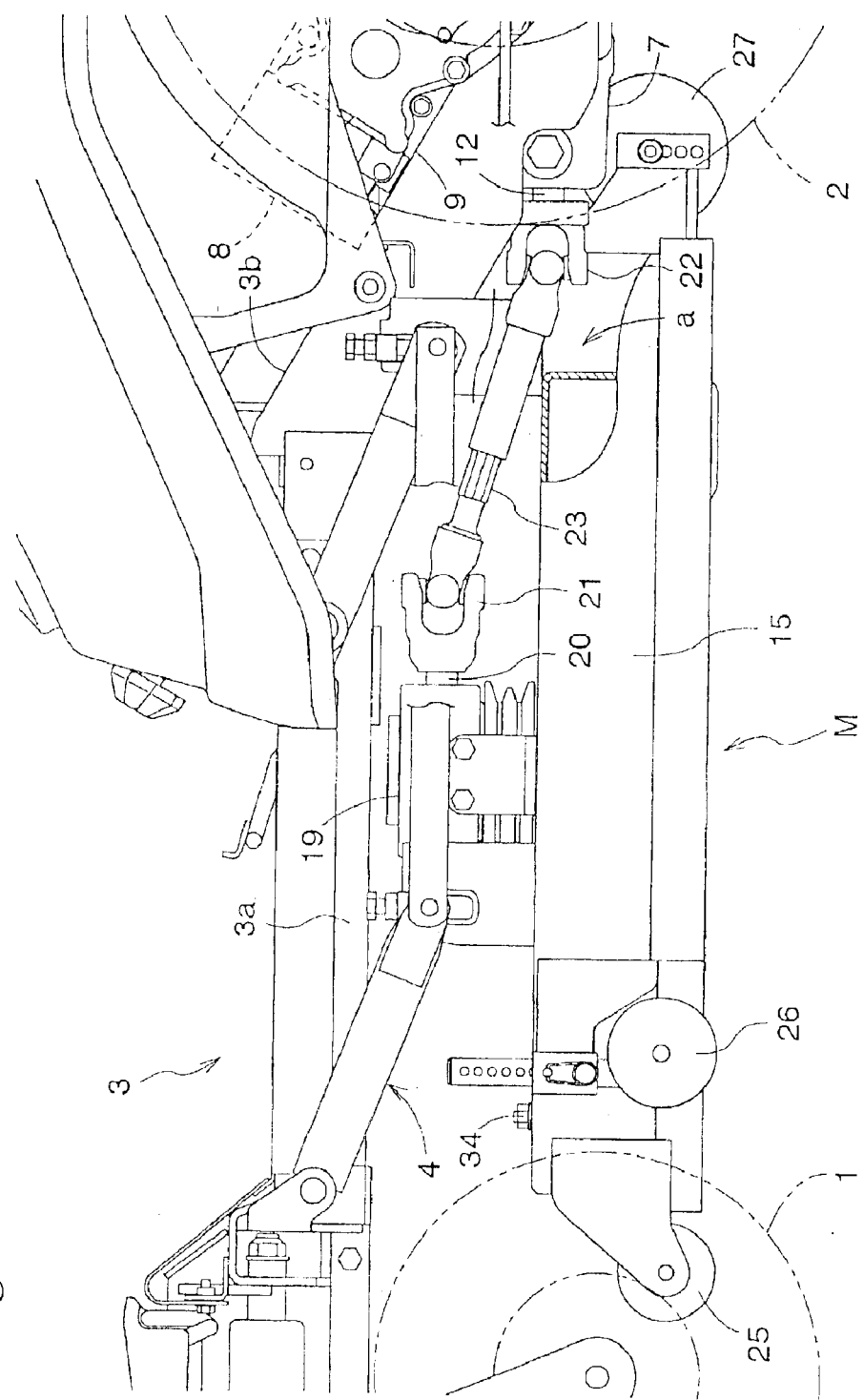
FIG. 5 is a side view, partly in section, of the mower unit in a raised position.

The mower deck 15 has a trapezoidal recess "a" formed in a sideways middle region at the rear end thereof. This recess "a" has a depth to lie forward of the rear universal joint 22. Thus, as shown in FIG. 5, the mower unit M may be raised to such a large extent that the rear universal joint 22 enters the recess "a."

The mower deck 15 has obstacle-riding idle rollers (anti-scalp rollers) 25 and 26 arranged in a middle position and adjacent right and left ends at the front end thereof, and obstacle-riding idle rollers 27 arranged in right and left positions adjacent the middle at the rear end. When the mower unit M vertically movable suspended by the link mechanism 4 approaches a slope or a ridge, one or more of the idle rollers 25, 26 and 27 ride(s) the ridge or the like to raise the mower unit M. This prevents the mower deck 15 from directly contacting the ground. The idle roller 25 in the middle position at the front of the deck 15 and the right and left idle rollers 27 at the rear are fixed against swiveling, while the right and left idle rollers 26 at the front are casters. When the idle rollers 26 engage the ground in time of a sharp turn such as a pivot turn or spin turn of the vehicle body 3, the idle rollers 26 smoothly roll and change directions, following the turning movement of the mower unit M. This avoids scraping of grass by the idle rollers 26 moving extensively.

This mower unit M can vary interior specifications of the mower deck 15 to offer the option of three different modes of grass cutting operation. Each operating mode will be described hereinafter.

[Shredding Side Discharge Mode]

Figure 6:
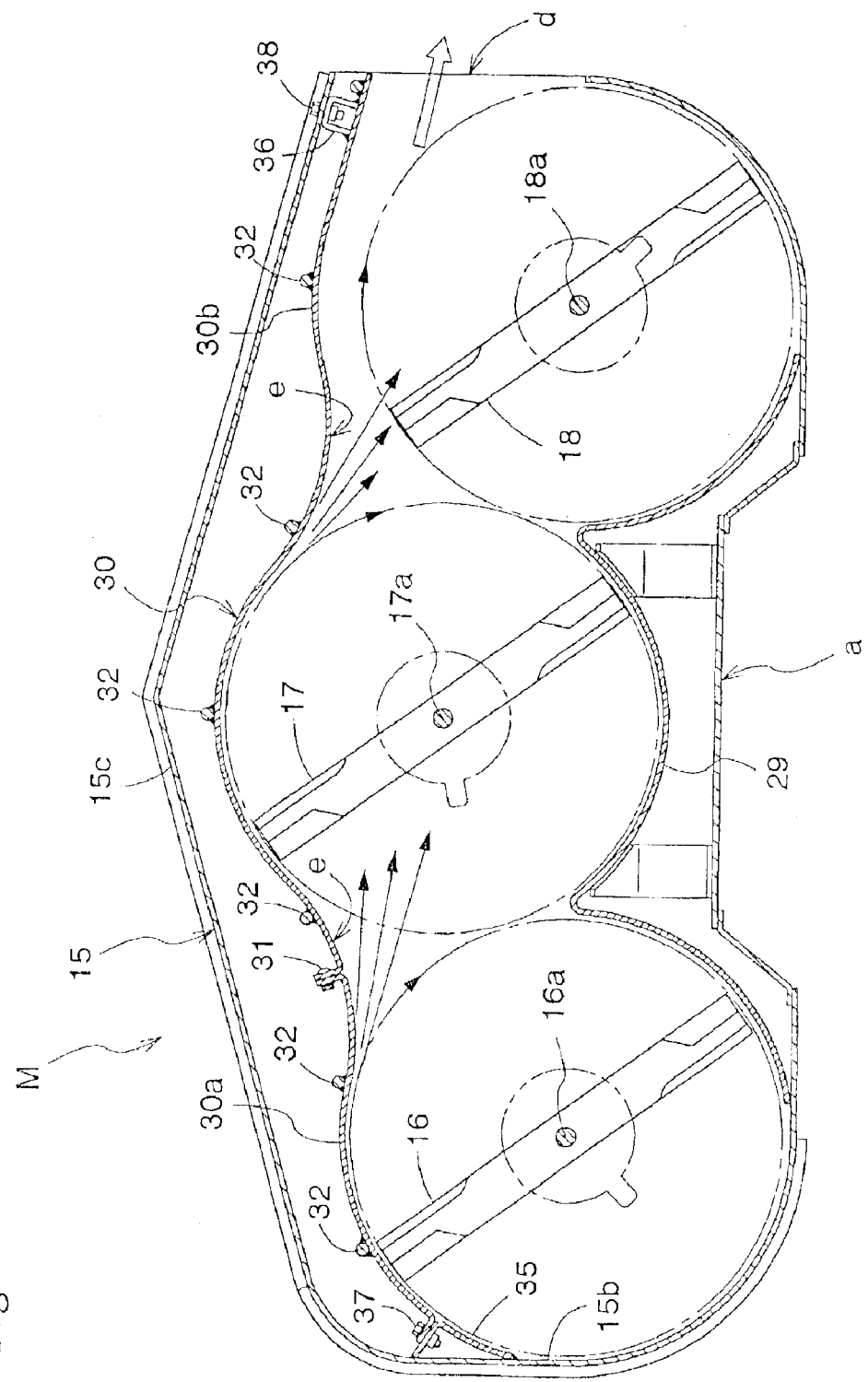
FIG. 6 is a cross-sectional plan view of the mower unit in a shredding side discharge mode.
Figure 7:
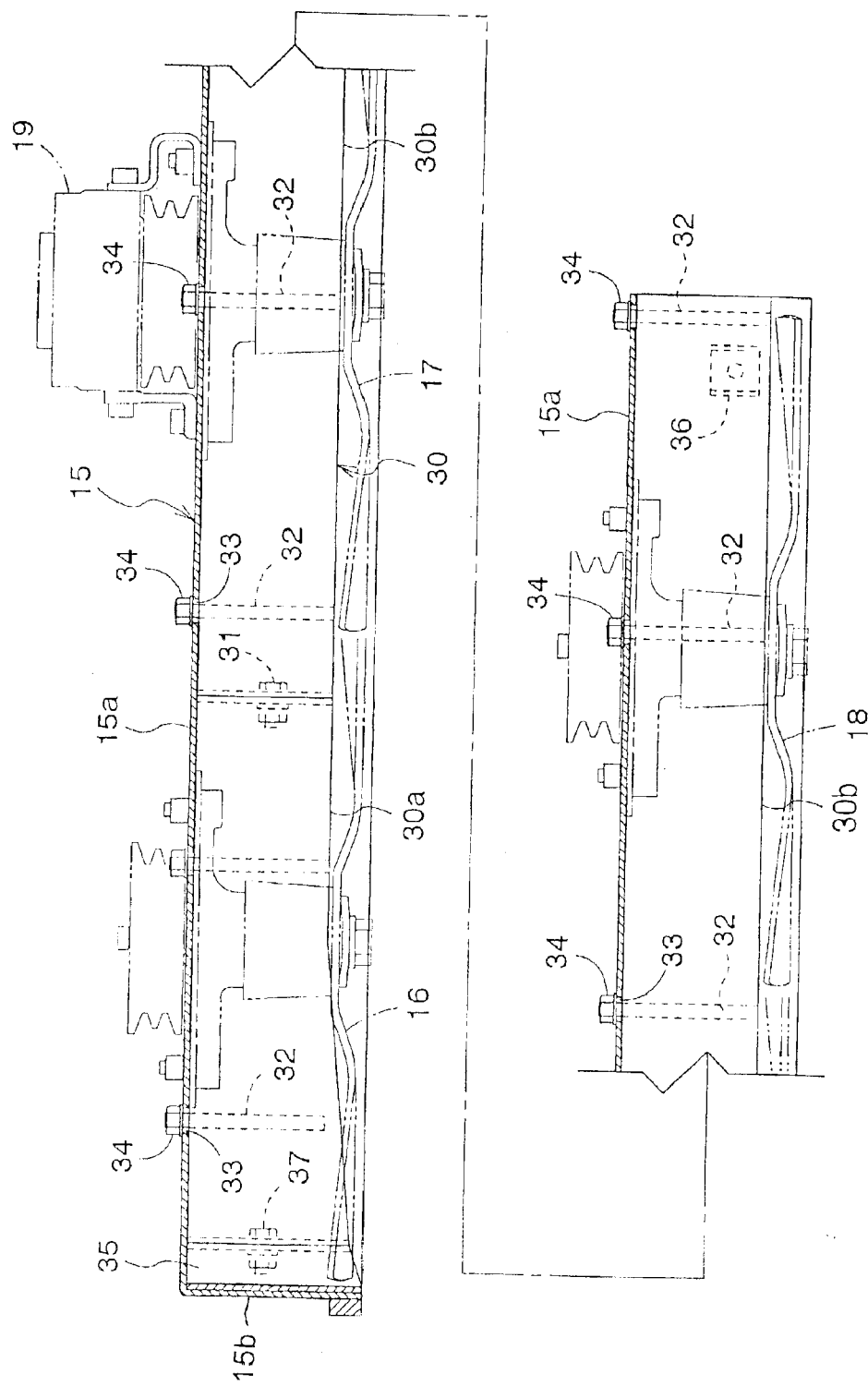
FIG. 7 is a rear view in vertical section of the mower unit in the shredding side discharge mode.
Figure 8:
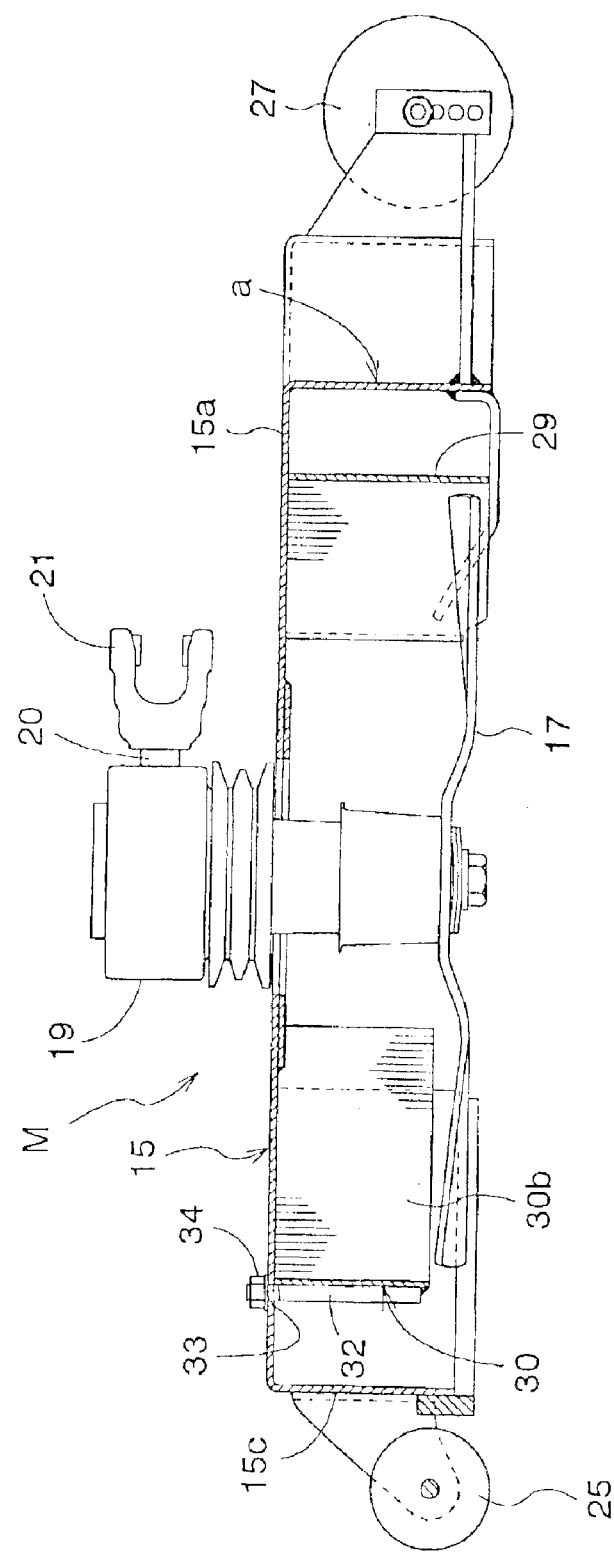
FIG. 8 is a side view in vertical section taken in a sideways middle position of the mower unit in the shredding side discharge mode.

FIG. 6 shows a cross-sectional plan view of the mower unit M in a shredding side discharge mode suited for cutting upper part of grass under good care, cutting the clippings into relatively small pieces, and discharging and scattering the clippings from the grass discharge opening d. This mower unit M has a rear baffle 29 fixedly welded to a rear position in the mower deck 15 for concentrically surrounding rear parts of the tracks of rotation of the rotary blades 16, 17 and 18, and a front baffle 30 detachably attached to a front position in the mower deck 15 for surrounding front parts of the tracks of rotation of the rotary blades 16, 17 and 18.

This front baffle 30 is in the form of a vertical plate curved into an undulating shape, and includes curved segments for concentrically surrounding the front parts of the tracks of rotation of the rotary blades 16, 17 and 18, and counter curved segments connecting these curved segments. As seen from FIG. 6, the curved segments and counter curved segments are curved in opposite directions. The curved segments have a radius of curvature slightly larger than the radius of rotation of the rotary blades 16, 17 and 18. The radius of curvature of the counter curved segments is approximately the same as the radius of rotation of the corresponding rotary blades 16, 17 and 18. One of the counter curved segments connects two adjacent curved segments smoothly.

A first front baffle 30a opposed to the front part of the rotary blade 16 most upstream (left end) in the grass transport direction and a second front baffle 30b opposed the front parts of the rotary blades 17 and 18 in the middle and most downstream (right end) in the grass transport direction are in abutment and connected to each other by a bolt 31. The first front baffle 30a and second front baffle 30b have mounting bolts 32 fixedly welded to front surfaces thereof. On the other hand, the top board 15a of the mower deck 15 defines mounting bores 33 for receiving the bolts 32. The bolts 32 of the front baffle 30 are inserted into the bores 33 from inside the deck 15, and nuts 34 are fastened to projecting ends of the bolts 32. The mower deck 15 has a mounting bracket 35 fixedly welded to a left side wall 15b thereof for abutting on the left end of the first front baffle 30a, while the second front baffle 30b has a mounting bracket 36 fixedly welded to a front surface at the right end thereof. The left end of the first front baffle 30a is fastened to the mounting bracket 35 with a bolt 37. The bracket 36 is fastened to the front wall 15b of the mower deck 15 with a bolt 38. Thus, the front baffle 30 is firmly fixed to the inside of the deck 15.

The front baffle 30 with the undulating shape has crest portions e protruding inwardly of the deck 15, i.e. the portions opposed to areas between adjacent rotary blades, having a large curvature substantially corresponding to the radius of blade rotation. Part of grass clippings cut by the upstream rotary blades are guided by inwardly curved surfaces of the front baffle 30 to be entrained and cut into small pieces by the rotating blades. Part of the grass clippings are guided by the smoothly protruding crest portions e to be distributed to the areas of rotation of the downstream rotary blades to be cut into small pieces.

[Mulching Mode]

Figure 9:
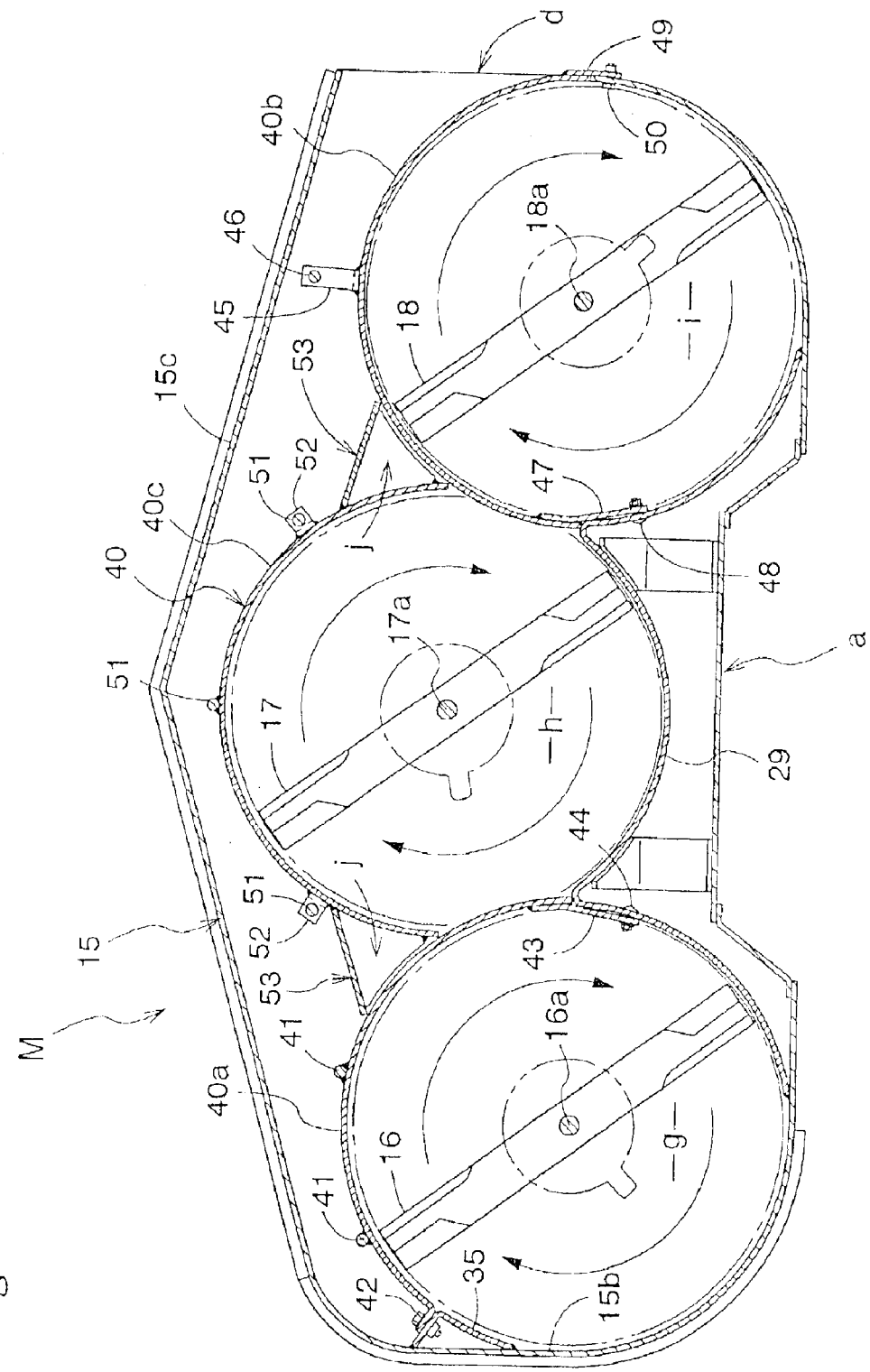
FIG. 9 is a cross-sectional plan view of the mower unit in a mulching mode.
Figure 10:
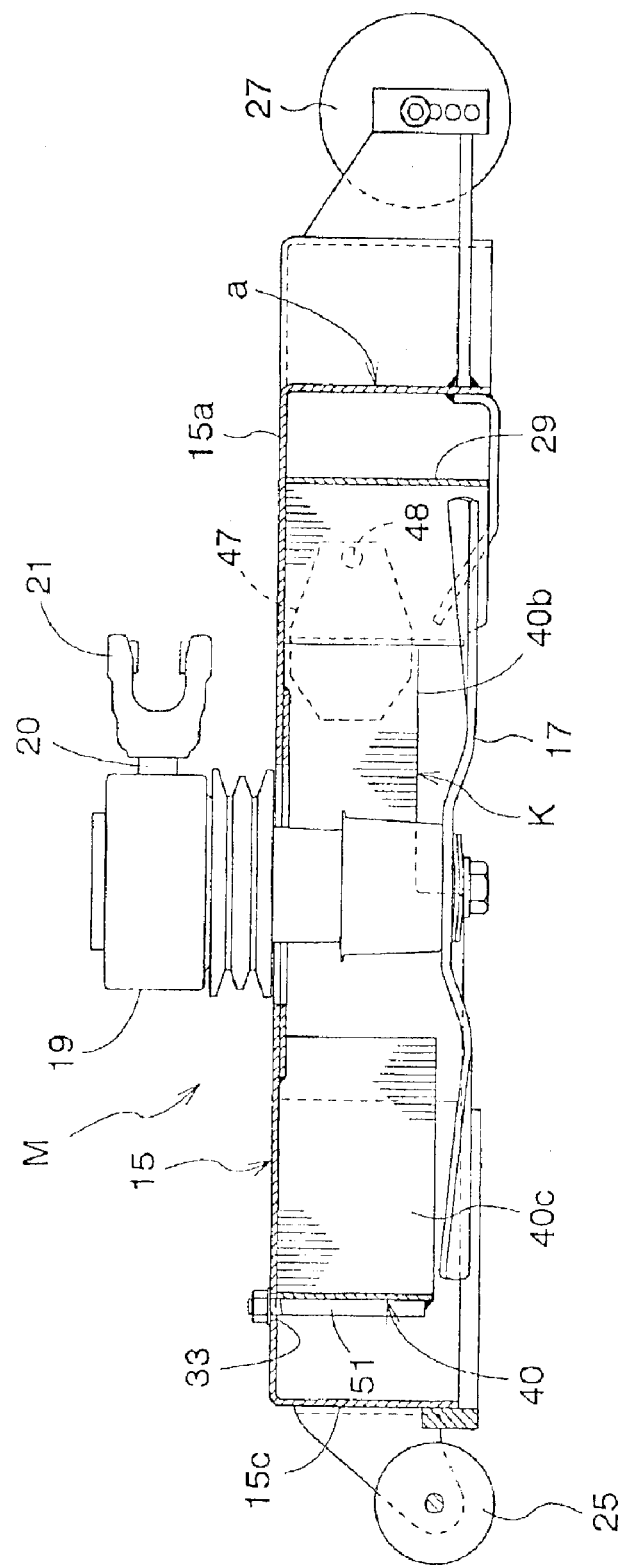
FIG. 10 is a side view in vertical section taken in the sideways middle position of the mower unit in the mulching mode.

FIG. 9 shows a cross-sectional plan view of the mower unit M in a mulching mode for cutting grass clippings into sufficiently small pieces and leaving them along the track of the mower. In this mode, the foregoing front baffle 30 is replaced by a mulching baffle 40 for forming, in combination with the rear baffle 29, circular mulching chambers g, h and i surrounding the tracks of rotation of the rotary blades 16, 17 and 18, respectively.

Figure 14:
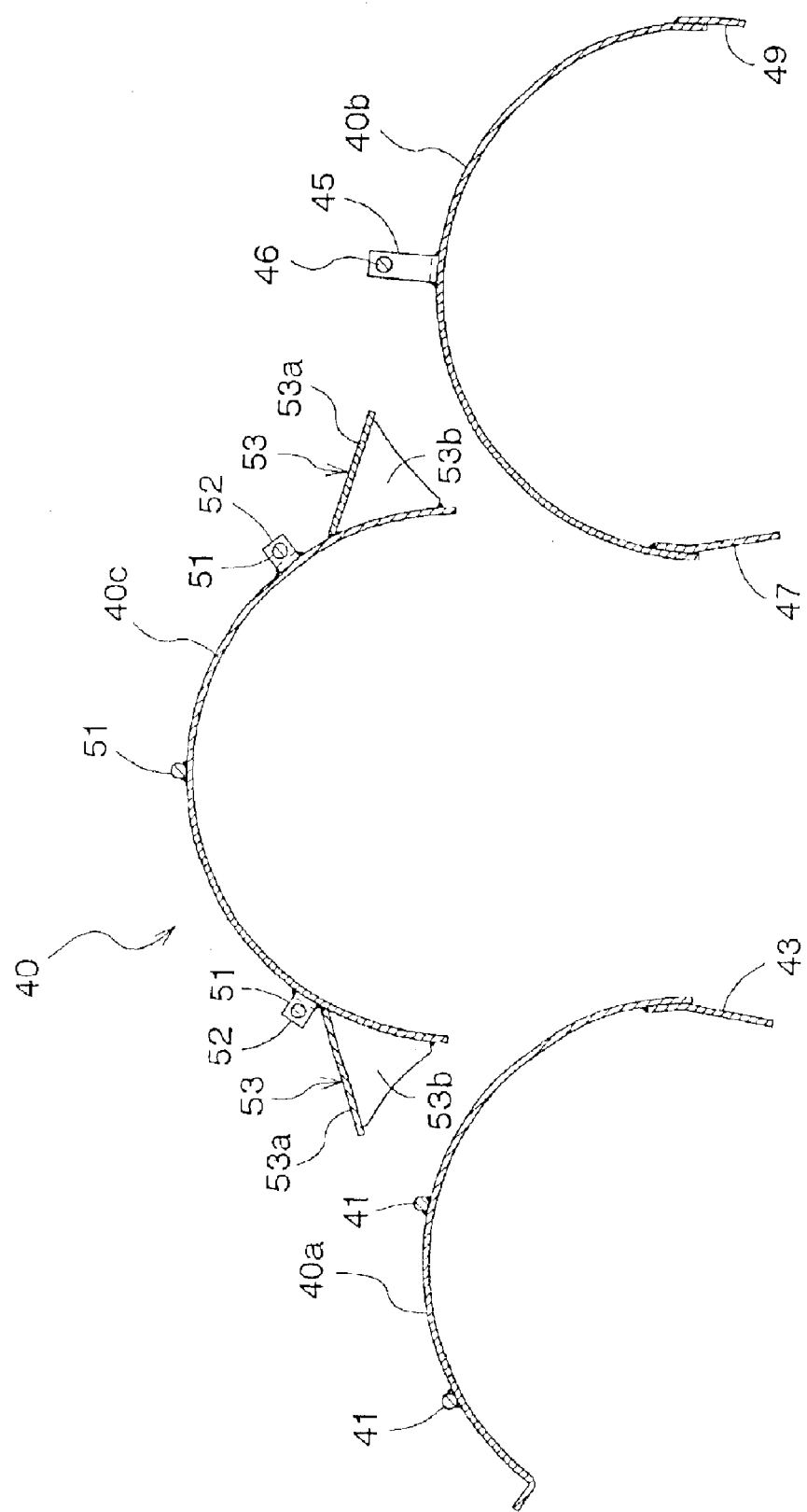
FIG. 14 is an exploded plan view showing components of a mulching baffle.

As shown in FIG. 14, the above mulching baffle 40 includes a left mulching baffle 40a, a right mulching baffle 40b, and a middle mulching baffle 40c. These baffles are secured to the deck 15 by using the mounting bores 33.

The left mulching baffle 40a is attached to the mounting bores 33 of the top board 15a by using bolts 41 fixed to the front surface of the baffle 40a. The left end of the left mulching baffle 40a is connected to the bracket 35 on the deck 15 by a bolt 42. The left mulching baffle 40a has a patch 43 fixedly welded to the right end thereof and fastened to the rear baffle 29 by a bolt 44.

The right mulching baffle 40b is attached to one of the mounting bores 33 of the top board 15a by using a bolt 46 fixed to the front surface of the baffle 40b through a support bracket 45. The right mulching baffle 40b has a patch 47 fixedly welded to the left end thereof and fastened to the rear baffle 29 by a bolt 48, and a patch 49 fixedly welded to the right end of the right mulching baffle 40b and fastened to a position rearwardly of the grass discharge opening d by a bolt 50.

Figure 11:
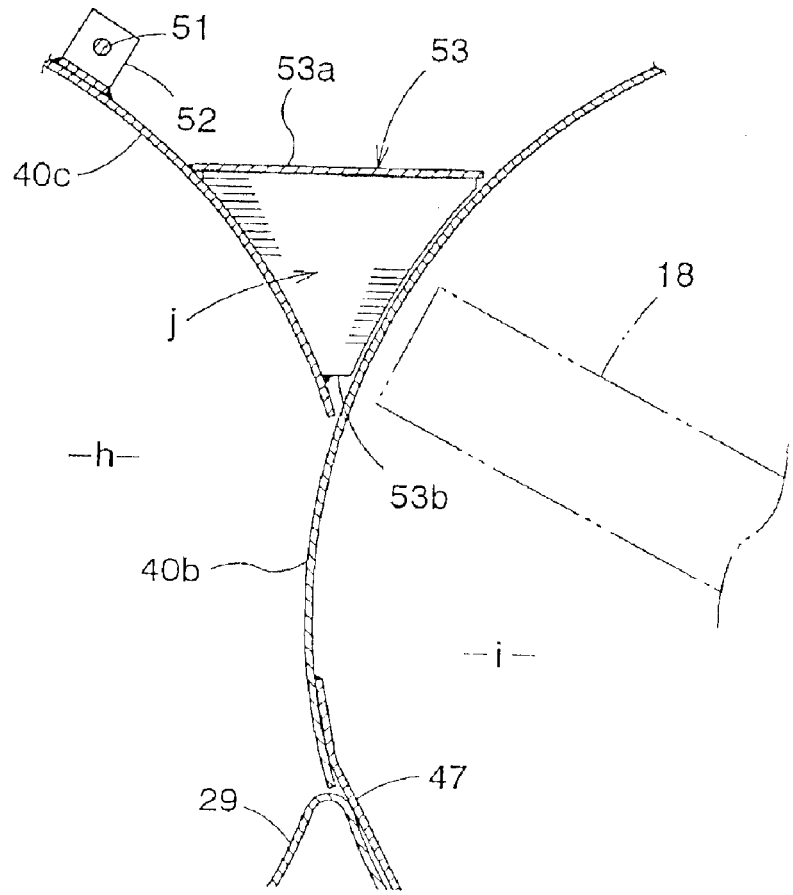
FIG. 11 is a cross-sectional plan view showing part of a mulching baffle.
Figure 12:
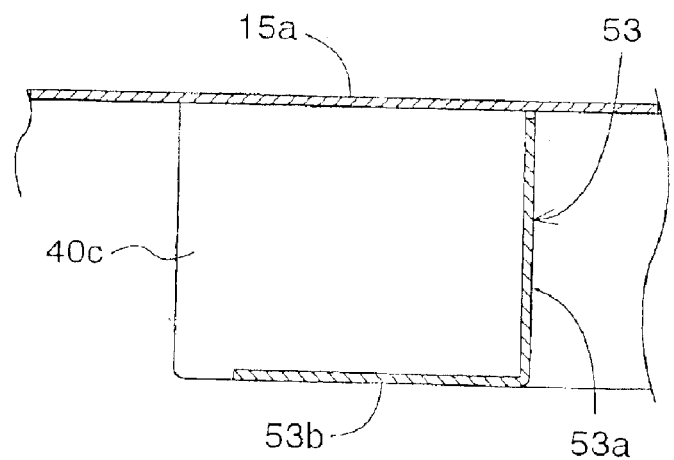
FIG. 12 is a side view in vertical section of a guide member provided for a mulching baffle.
Figure 13:
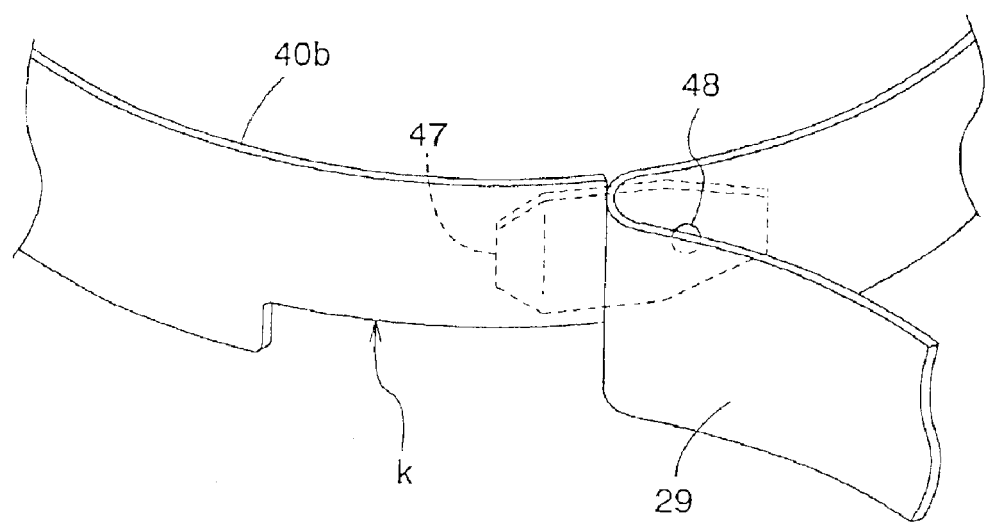
FIG. 13 is a perspective view showing part of a mulching baffle.

The middle mulching baffle 40c is attached to the mounting bores 33 of the top board 15a by using a bolt 51 directly fixed to the front surface of the baffle 40c and bolts 51 fixed to the front surface through support brackets 52. The middle mulching baffle 40c has guide members 53 fixedly welded to the left and right ends thereof for filling forward-facing V-shaped spaces j formed in junctions between the left and right mulching baffles 40a and 40b and middle mulching baffle 40c. As shown in FIGS. 11 and 12, each guide member 53 is formed of an L-shaped plate defining a front plate portion 53a for closing the front opening of the V-shaped space j, and a bottom plate portion 53b for closing the bottom of the V-shaped space j. The guide members 53 prevent grass having passed by the front wall 15c of the mower deck 15 and having been introduced into the deck 15 from gathering into the V-shaped spaces j. This effectively reduces the chance of leaving the grass unreaped.

In this case, the bottom plate portions 53b perform the function to check the grass standing up and entering the V-shaped spaces j after passing by the front plate portions 53a.

The mulching chambers g and i of the left and right rotary blades 16 and 18 are formed circular and concentric with the tracks of rotation of the blades. The mulching chamber h of the middle rotary blade 17 has a shape partly encroached on by the mulching chambers g and i of the left and right rotary blades 16 and 18. The left and right mulching baffles 40a and 40b have cutouts k formed in lower positions of the portions thereof encroaching on the mulching chamber h of the middle rotary blade 17 in order to avoid interference with the middle rotary blade 17.

[Standard Side Discharge Mode]

Figure 15:
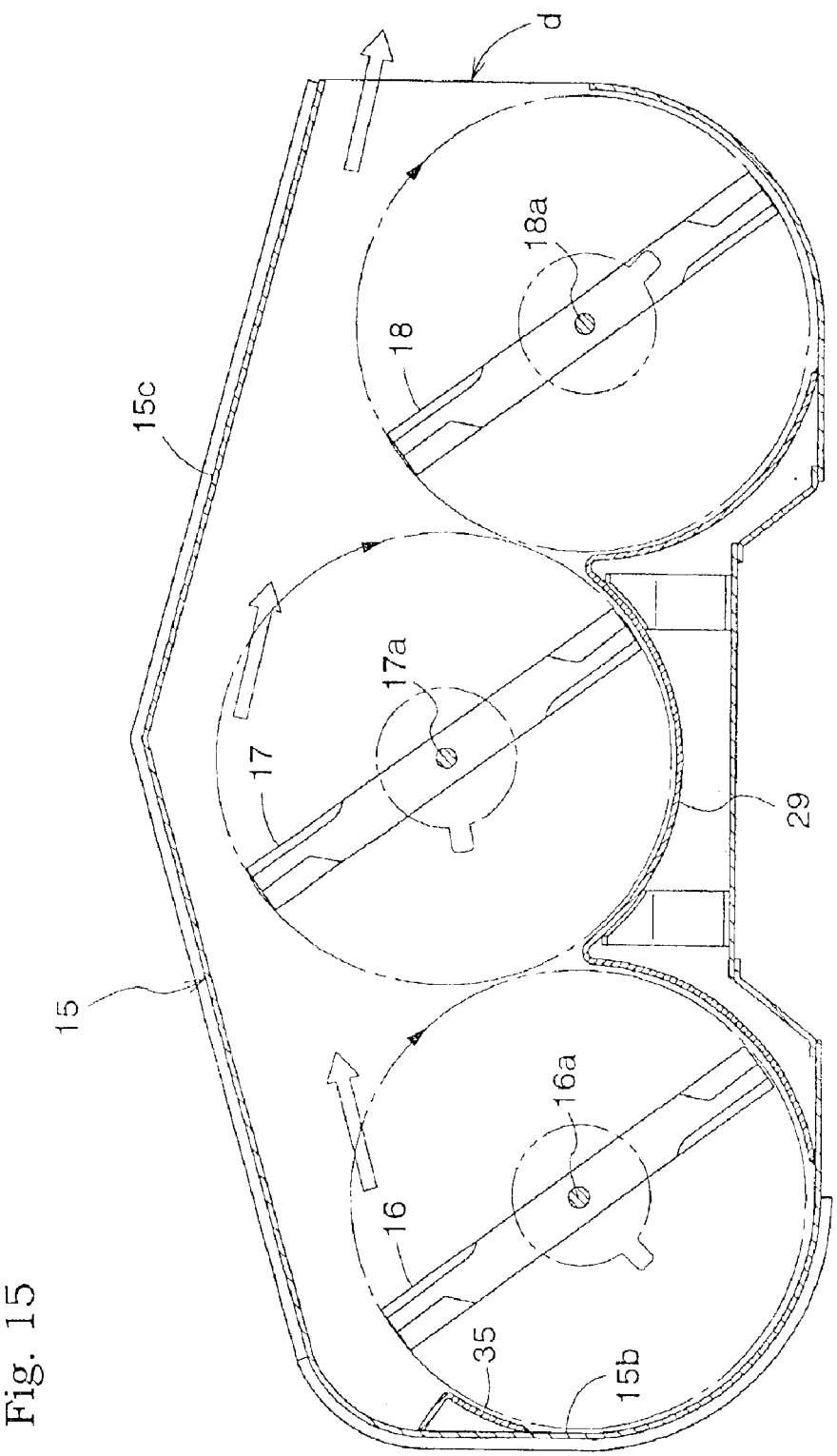
FIG. 15 is a cross-sectional plan view of the mower unit in a standard side discharge mode.

FIG. 15 shows a cross-sectional plan view of the mower unit M in a standard side discharge mode for cutting long grass and discharging the clippings from the grass discharge opening d. In this mode, the front baffle 30 and the mulching baffle 40 are removed. The grass clippings cut by the upstream rotary blades are transported quickly along the top board 15a and front wall 15c to the grass discharge opening d of the deck to be discharged therefrom without being guided to the cutting areas of the downstream rotary blades. Thus, long grass may be reaped without causing a useless shredding load.

[Other Embodiments]

This invention may be implemented in the following forms:

(1) The front baffle 30 may have an integral construction without being divided into two parts. Conversely, the front baffle 30 may have a three-part construction to be storable in a small bulk after detachment.

(2) The left and right mulching baffles 40a and 40b and middle mulching baffle 40c of the mulching baffle 40 may be integrated beforehand such as by welding. In this case, the guide members 53 may be used as connecting and reinforcing members of the left and right mulching baffles 40a and 40b and middle mulching baffle 40c. This renders the mulching baffle 40 highly rigid, while avoiding large quantities of grass gathering in the V-shaped spaces g.

(3) The device for attaching and detaching the front baffle 30 and mulching baffle 40 to/from the mower deck 15 is not limited to what is described hereinbefore. For example, nuts may be fixedly welded to the upper ends the front baffle 30 and mulching baffle 40, with bolts inserted through the mounting bores 33 of the top board 15a of the deck from above, and tightened into the nuts of the front baffle 30 and mulching baffle 40.

What is claimed is:

1. A mower unit system attachable to a vehicle body comprising:

a mower deck having a top board and one front wall and one side wall depending from said top board, said mower deck defining a grass discharge opening at an opposite side of said side wall;

a plurality of rotary blades juxtaposed inside said mower deck to be rotatable about vertical axes, all of said rotary blades being rotatable in the same direction so that a front half, with respect to a traveling direction, of a track of rotation of each rotary blade points toward the side having said grass discharge opening;

a rear baffle depending from said top board for enclosing said rotary blades in combination with said front wall, and surrounding, in form of a concentric part circle, a rear portion of the track of rotation of each rotary blade; and a front baffle and a separate mulching baffle, each alternatively and selectively attachable to said mower deck to be located forwardly of the tracks of rotation of said rotary blades;

said front baffle including curved segments each for surrounding, in the form of a concentric part circle, a front portion of the track of rotation of one rotary blade, and a counter curved segment for connecting adjacent pair of said curved segments, thereby to guide grass clippings cut by the rotary blades located upstream with respect to a grass discharging direction, into areas of rotation of the rotary blades located downstream with respect to the grass discharging direction;

said mulching baffle, in combination with said rear baffle, defining a mulching chamber surrounding the track of rotation of each rotary blade.

2. The mower unit system as defined in claim 1, wherein said rear baffle has an inner configuration for surrounding, in form of a concentric part circle, the rear portion of the track of rotation of each rotary blade.

3. The mower unit system as defined in claim 1, wherein said top board of the mower deck is formed flat so that the mower deck has a substantially uniform height throughout over the ground.

4. The mower unit system as defined in claim 1, wherein said front wall is shaped, in combination with said top board, said side wall and said rear baffle, for transmitting grass clippings cut by said rotary blades to said grass discharge opening when both said front baffle and said mulching baffle are removed.

5. The mower unit system as defined in claim 1, wherein each of said front baffle and said mulching baffle is dividable into at least two segments.

6. The mower unit system as defined in claim 1, wherein said counter curved segment of said front baffle have a radius substantially corresponding to a radius of rotation of said rotary blades.

7. The mower unit system as defined in claim 1, wherein three rotary blades are juxtaposed inside the mower deck, and when said mulching baffle is attached, portions of said mulching baffles and portions of said rear baffle define circular mulching chambers of left and right rotary blades concentric with tracks of rotation of the left and right rotary blades, and a remaining portion of said mulching baffle and a remaining portion of said rear baffle define a mulching chamber of the middle rotary blade having a shape partly encroached on by the mulching chambers of the left and right rotary blades.

8. The mower unit system as defined in claim 1, wherein when both said front baffle and said mulching baffle are removed from said mower deck, said front wall and said rear baffle form a grass clippings processing space for standard side discharge.

9. A mower unit attachable to a vehicle body comprising:
a mower deck having a top board and one front wall and one side wall depending from said top board, said mower deck defining a grass discharge opening at an opposite side of said side wall;
a plurality of rotary blades juxtaposed inside said mower deck to be rotatable about vertical axes, all of said rotary blades being rotatable in the same direction so that a front half, with respect to a traveling direction, of a track of rotation of each rotary blade points toward the side having said grass discharge opening;
a rear baffle depending from said top board for enclosing said rotary blades in combination with said front wall, and surrounding, in the form of a concentric part circle, a rear portion of the track of rotation of each rotary blade; and
a front baffle attached to said mower deck to be located forwardly of the tracks of rotation of said rotary blades;
said front baffle including curved segments each for surrounding, in the form of a concentric part circle, a front portion of the track of rotation of one rotary blade, and a counter curved segment for connecting adjacent pair of said curved segments, thereby to guide grass clippings cut by the rotary blades located upstream with respect to a grass discharging direction, into areas of rotation of the rotary blades located downstream with respect to the grass discharging direction;

wherein said counter curved segments of said front baffle have a radius substantially corresponding to a radius of rotation of said rotary blades.

10. A mower deck having a top board and one front wall and one side wall depending from said top board, said mower deck defining a grass discharge opening at an opposite side of said side wall, a plurality of rotary blades juxtaposed inside said mower deck to be rotatable about vertical axes, all of said rotary blades being rotatable in the same direction so that a front half, with respect to a traveling direction, of a track of rotation of each rotary blade points toward the side having said grass discharge opening, and a front baffle attachable to said mower deck to be located forwardly of the tracks of rotation of said rotary blades, said front baffle comprising:
a plurality of curved segments each for surrounding, in the form of a concentric part circle, a front portion of the track of rotation of one rotary blade; and
a counter curved segment for connecting adjacent pair of said curved segments;
wherein said adjacent pair of curved segments and said counter curved segment define continuous guide surfaces therebetween for guiding grass clippings cut by the rotary blades located upstream with respect to a grass discharging direction, into areas of rotation of the rotary blades located downstream with respect to the grass discharging direction.

11. The mower deck unit system as defined in claim 10, wherein said counter curved segments of said front baffle have a radius substantially corresponding to a radius of rotation of said rotary blades.

12. A mower unit attachable to a vehicle body comprising:
a mower deck having a top board and one front wall and one side wall depending from said top board, said mower deck defining a grass discharge opening at an opposite side of said side wall;
a plurality of rotary blades juxtaposed inside said mower deck to be rotatable about vertical axes, all of said rotary blades being rotatable in the same direction so that a front half, with respect to a traveling direction, of a track of rotation of each rotary blade points toward the side having said grass discharge opening;
a rear baffle depending from said top board for enclosing said rotary blades in combination with said front wall, and surrounding, in the form of a concentric part circle, a rear portion of the track of rotation of each rotary blade; and
a front baffle attached to said mower deck to be located forwardly of the tracks of rotation of said rotary blades;
said front baffle including curved segments each for surrounding, in the form of a concentric part circle, a front portion of the track of rotation of one rotary blade and a counter curved segment for connecting adjacent pair of said curved segments,
wherein said adjacent pair of curved segments and said counter curved segment define continuous guide surfaces therebetween for guiding grass clippings cut by the rotary blades located upstream with respect to a grass discharging direction, into areas of rotation of the rotary blades located downstream with respect to the grass discharging direction; and
wherein a first point of inflection is defined between one end of said counter curved segment and one of said adjacent pair of curved segments, a second point of inflection is defined between the other end of said counter curved segment and the other of said adjacent pair of curved segments, said first point of inflection being associated with one of adjacent pair of the tracks of blade rotation, and said second point of inflection being associated with the other of adjacent pair of the tracks of blade rotation.

13. A mower deck having a top board and one front wall and one side wall depending from said top board, said mower deck defining a grass discharge opening at an opposite side of said side wall, a plurality of rotary blades juxtaposed inside said mower deck to be rotatable about vertical axes, all of said rotary blades being rotatable in the same direction so that a front half, with respect to a traveling direction, of a track of rotation of each rotary blade points toward the side having said grass discharge opening, and a front baffle attachable to said mower deck to be located forwardly of the tracks of rotation of said rotary blades, said front baffle comprising:

a plurality of curved segments each for surrounding, in the form of a concentric part circle, a front portion of the track of rotation of one rotary blade; and a counter curved segment for connecting adjacent pair of said curved segments;

wherein said adjacent pair of curved segments and said counter curved segment define continuous guide surfaces therebetween for guiding grass clippings cut by the rotary blades located upstream with respect to the grass discharging direction, into areas of rotation of the rotary blades located downstream with respect to the grass discharging direction; and wherein a first point of inflection is defined between one end of said counter curved segment and one of said adjacent pair of curved segments, a second point of inflection is defined between the other end of said counter curved segment and the other of said adjacent pair of curved segments, said first point of inflection being associated with one of adjacent pair of the tracks of blade rotation, and said second point of inflection being associated with the other of adjacent pair of the tracks of blade rotation.

* * * * *